No. 622,602. Patented Apr. 4, 1899.
G. A. BURWELL.
VEHICLE WHEEL.
(Application filed May 6, 1898.)
(No Model.)
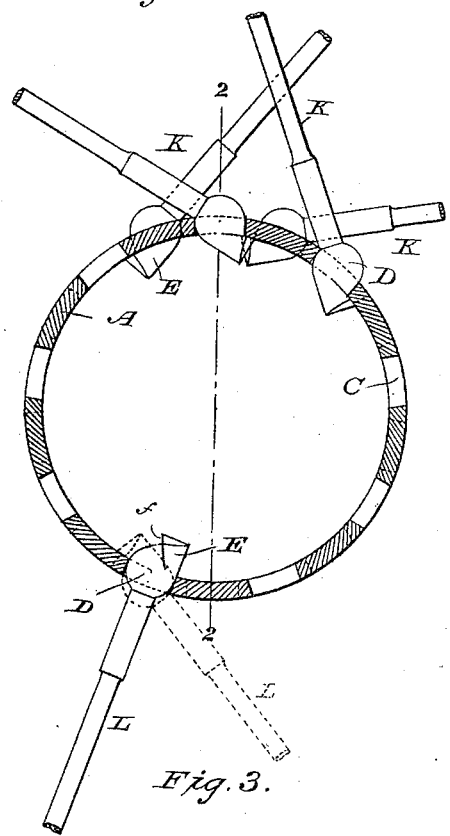
Fig. 1.
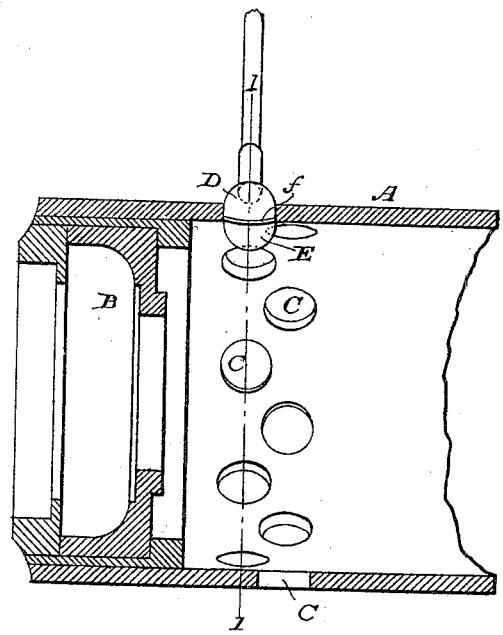
Fig. 2.
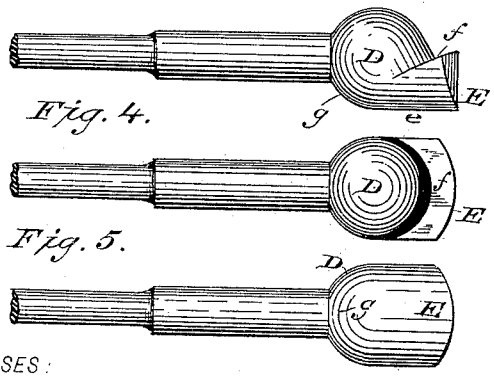
Fig. 3.
Fig. 4.
Fig. 5.
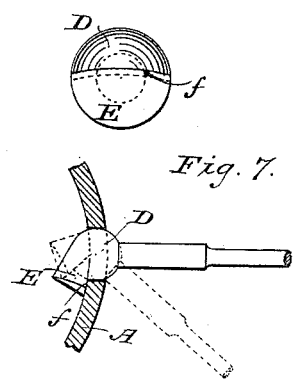
Fig. 6.
Fig. 7.
WITNESSES:
Geo. T. Williams
W. L. Corris
INVENTOR
George A. Burwell
BY
Wm. A. Skinkle
his ATTORNEY.

UNITED STATES PATENT OFFICE.

GEORGE A. BURWELL, OF TOLEDO, OHIO.

VEHICLE-WHEEL.

SPECIFICATION forming part of Letters Patent No. 622,602, dated April 4, 1899.

Application filed May 6, 1898. Serial No. 679,883. (No model.)

*To all whom it may concern:*

Be it known that I, GEORGE A. BURWELL, residing in Toledo, in the county of Lucas and State of Ohio, have invented certain new and useful Improvements in Vehicle-Wheels, of which the following is a specification, that will enable those skilled in the art to which my invention pertains to make and use the same.

My invention relates to means for attaching metallic spokes to plain metallic cylindrical hubs of wheels, particularly of such wheels as are used in bicycles and kindred vehicles where the spokes are under tensile strains rather than thrust strains, as are the spokes in ordinary carriage-wheels.

It consists of a plain cylindrical barrel-hub provided with a series of apertures through which the heads of the straight spokes may be inserted, the heads of the spokes being adapted to pass into said apertures, fitting snugly therein and provided on their sides opposite the spokes with lugs or projections which when the spokes are adjusted to their proper working positions bear against the inner sides of the barrel of the hub, preventing the withdrawal of the heads from the aperture and also preventing the spokes from turning on their own axes. Its objects are to provide means by which straight spokes may be used and quickly and easily connected to the hub from the outside without disturbance of any of the interior portions of the hub or its connections and without leaving openings therethrough for the passage of dirt or foreign substances to the interior of the hub, to facilitate the assembling of the parts or the removal of a broken spoke and its ready replacement with a new one, and to produce a cheaply-constructed hub and a firm and reliable connection for straight spokes thereto.

The accompanying drawings show my invention in the forms now considered most desirable by me; but these might be varied in some of the details and relative arrangements of the parts within the limit of the skill of a good mechanic without departing from the spirit of the claims at the end of this specification.

Figure 1 is a transverse section through the barrel of the hub on the line 1 1 of Fig. 2, showing several spokes attached thereto and in working position and one in the position assumed when it is being inserted. Fig. 2 is a longitudinal section through a portion of a hub on the line 2 2 of Fig. 1, showing one spoke in place. Fig. 3 is a side elevation, on an enlarged scale, of the inner end of one of the spokes and its enlarged head. Fig. 4 is a plan or top view. Fig. 5 is a bottom view, and Fig. 6 an end view, of the same. Fig. 7 shows a modification of my invention adapting it for the attachment of direct instead of tangent spokes.

A is the plain cylindrical barrel of a wheel-hub, to which may be fitted at each end ball-races B and their necessary accompaniments. The hub is perforated at or near its ends with one or more series of holes C in any preferred form of alinement. These are preferably round holes, as shown, drilled straight through the sides of the hub A; but other forms might be used if found desirable. Each spoke is formed with a head D of the same contour as the holes C and adapted to pass into and fit snugly therein, completely closing the holes against the passage of dirt or dust to the interior of the hub. These heads are spherical when round holes are used and are provided with lugs or projections E, formed on their sides opposite the spokes. These lugs are rounded on their bottom sides $e$, the curvature being the same as that of the head and merging into the same. The upper side of the lug is formed with a flat top or table $f$, preferably slightly curved, as shown, to adapt it to fit against the inner surface of the barrel of the hub when the spoke is in working position, locking the head absolutely against withdrawal or accidental displacement as long as the spoke remains in its working position. When the spoke is in this position, the side of the spherical head at about the point $g$ bears against the side of the aperture in which the head rests and resists whatever tensile strain there may be on the spoke. The flat surface $f$ on the projection E, bearing against the inner surface of the barrel, holds the spoke from turning on its axis when the nipple at its rim end is being screwed to adjust the tension of the spoke.

In Fig. 1 the spokes K are shown in working position, while the spoke L is shown by full lines in the position assumed when it is being inserted and by dotted lines in its working position.

Figs. 1 to 6, inclusive, illustrate the form of tangent-spokes and the method of applying the same to the hub; but in Fig. 7 I show as a modification of my invention the application of the same principle of locking the head of a direct or radial spoke to the barrel of the hub. A tangent-spoke is inserted radially through the openings of the barrel and then turned over to its tangent position, while, as shown by dotted lines in Fig. 7, a direct spoke should be in a tangent position when its head is being inserted in an opening of the barrel of the hub, and then when it is brought up to its direct, radial, or working position its lug E locks against the inner side of the barrel in the same manner as before explained in the tangent-spoke and prevents withdrawal of the head by any strain put upon the spoke.

Having thus described my invention, what I claim, and desire to secure by Letters Patent, is—

1. A combination of the cylindrical hub with apertures through its sides, the spokes with enlarged heads adapted to pass through and completely fill and close said apertures, and provided on their sides opposite the spokes with projecting lugs or ledges adapted to engage the inside of the hub-cylinder when the spoke is in working position.

2. A combination of the plain cylindrical hub with round apertures through its sides, the spokes with spherical heads adapted to pass through said apertures, closing them completely, and provided on their sides opposite the spokes with projecting lugs or ledges adapted to engage the inside of the hub-cylinder when the spoke is in working position.

3. A combination of the plain cylindrical hub with apertures through its sides, the spokes with enlarged heads adapted to pass into and completely close said apertures, and provided on their sides opposite the spokes with projecting lugs or ledges, each of said lugs adapted to fit and bear against the inside of the hub of the cylinder when its spoke is in working position but so located relatively to the axial line of the spoke that the spoke must be in position other than its working position when its head is being inserted in an aperture, after which insertion it is swung to its working position bringing the locking-ledge into contact with the inside of the cylinder.

In testimony whereof I affix my signature, in the presence of two witnesses, at Toledo, Ohio, April 26, 1898.

GEORGE A. BURWELL.

Witnesses:
W. H. RAYNOR,
P. H. GOODALL.